LOCKED PHASE FREQUENCY DIVIDER

Filed May 15, 1957

INVENTOR.
Robert George Wagoner
BY
H. H. Craniger
Attorneys 2,877,350

LOCKED PHASE FREQUENCY DIVIDER

Robert George Wagoner, Marlton, N. J., assignor, by mesne assignments, to the United States of America as represented by the Secretary of the Navy Application May 15, 1957, Serial No. 659,446

1 Claim. (Cl. 250—36)

The present invention relates to a frequency dividing apparatus and more particularly to a novel and improved electronic frequency divider circuit which is adapted to lock itself upon the frequency of a selected incoming signal.

In various types of electronic circuits and applications of the same it often becomes necessary and desirable to produce from an incoming signal an output signal having a frequency which is an exact submultiple of the frequency of the incoming signal. Although a number of different types of frequency dividing circuits have been devised in the past, considerable difficulty has been experienced heretofore in providing a relatively simple but reliable circuit which satisfactorily phase locks itself upon the frequency of a selected incoming signal.

Accordingly it is a principal object of the present invention to provide a novel and improved electronic frequency divider which is relatively simple in construction yet stable and reliable in operation.

It is a further object of the present invention to provide novel and improved electronic frequency dividing apparatus which locks on the frequency of an incoming signal despite small variations in said incoming signal frequency.

Figure 2:
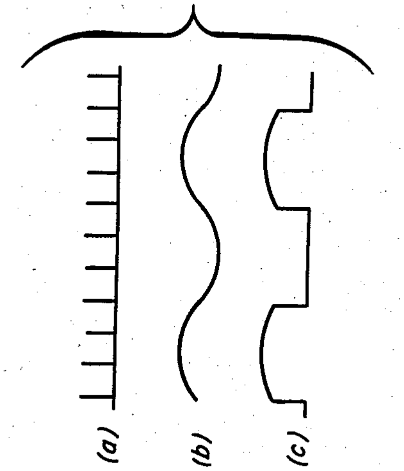
Figure 1:
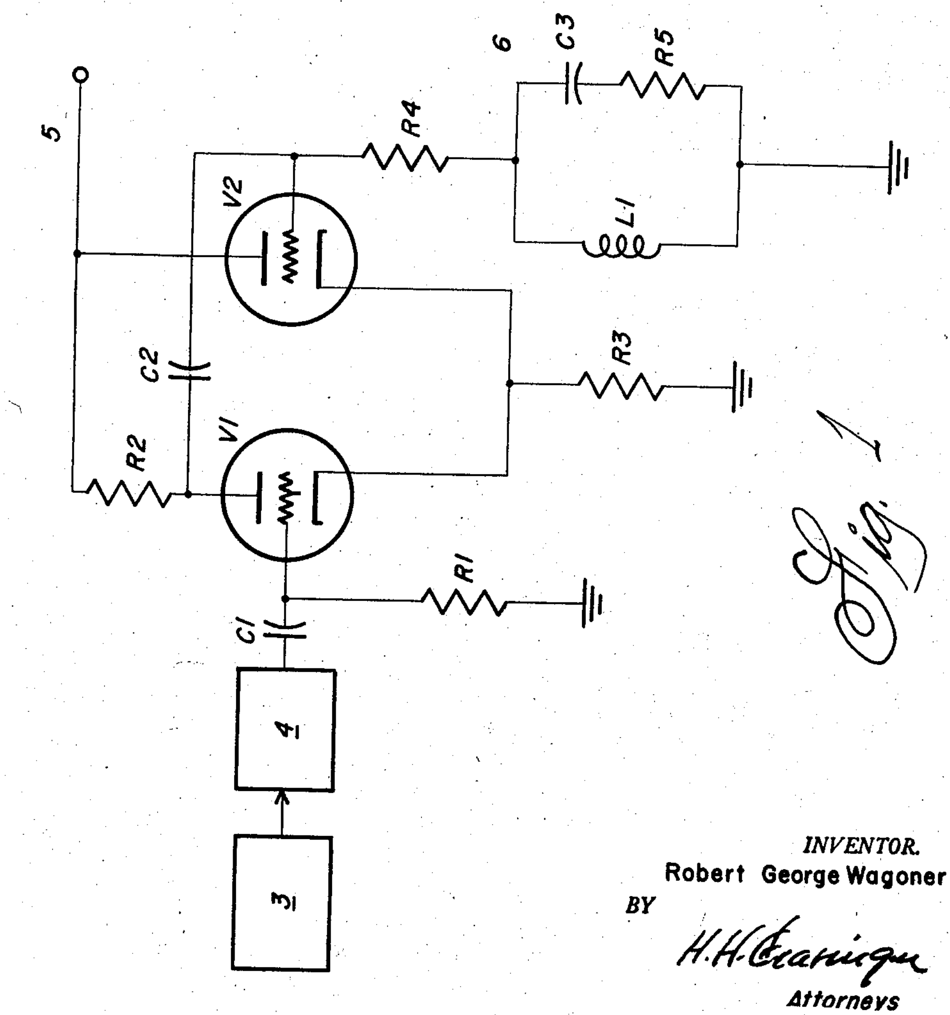

Other objects and many of the attendant advantages of this invention will be readily appreciated as the same becomes better understood by reference to the following detailed description when considered in connection with the accompanying drawing(s) wherein:

Figure 1 is a circuit diagram of a preferred embodiment of the present invention; and Figures 2*a*–2*c* are voltage waveforms produced at selected points in the circuit of the preferred embodiment of Figure 1.

In general the improved phase locked frequency dividing apparatus of the present invention includes a cathode coupled multivibrator circuit, a tank circuit tuned to resonate at the desired frequency, and means including the incoming signal and the oscillatory potential across the tank circuit for controlling the transitory cycles of the multivibrator circuit.

A preferred embodiment of the present invention is illustrated in Figure 1 of the drawing. As shown therein, the pulse or signal, the frequency of which is to be subdivided in accordance with the present invention, is fed from the generator source or the like 3 preferably through a suitable pulse shaping circuit 4 and through a circuit including condenser C–1 and resistor R–1 onto the control grid of tube V–1. The plate circuit of tube V–1 extends from the positive 300 volt supply line 5 through resistor R–2, the tube, and resistor R–3 to ground. The plate of tube V–1 is also coupled to the control grid of tube V–2 through condenser C–2. The plate circuit of tube V–2 extends from the positive 300 volt supply line 5 through the tube and resistor R–3 to ground. The control grid of tube V–2 is also coupled to ground through resistor R–4 and the tank circuit 6 which includes inductor L–1, condenser C–3, and resistor R–5.

Particularly good results have been obtained in various applications of the above described circuit where the following values for the circuit parameters have been used:

| | |
|---|---|
| $R_1$=47,000 ohms | $C_1$=.05 mfd. |
| $R_2$=22,000 ohms | $C_2$=.01 mfd. |
| $R_3$=2,200 ohms | $C_3$=.25 mfd. |
| $R_4$=10,000 ohms | $L_1$=7 henries |
| $R_5$=1,000 ohms | $V_1+V_2$=12AU7 |

In the operation of the above described circuit the signal source or the like 3 energizes the pulse shaping circuit 4 which preferably provides an output signal having a substantially constant frequency of repetition. The waveform of this signal after it has been fed through the pulse shaping circuit 4 is shown in Figure 2*a* of the drawing. This signal is then fed through condenser C–1 onto the control grid of triode V–1. Triode V–1, which is normally cut off by the bias potential produced by the flow of plate current of normally conducting triode V–2 through cathode resistor R–3, then conducts. When this occurs, the potential at the plate of triode V–1 drops sharply and a negative pulse is produced at the control grid of triode V–2. This cuts off triode V–2 and also shocks the tank circuit 6 into oscillation. When the grid of triode V–2 follows the sine wave oscillatory signal across the tank and swings in the positive direction, triode V–2 conducts and triode V–1 is cut off by the bias produced by the flow of plate current through cathode resistor R–3. The waveforms of the change of potential at the grid and cathode of triode V–2 are respectively shown in Figures 2*b* and 2*c* of the drawing. With triode V–1 cut off condenser C–2 charges toward the potential of supply line 5. As the potential across the tank circuit 6 swings toward a negative potential, the plate current through triode V–2 decreases, and the bias potential across cathode resistor R–3 in the plate circuit of triode V–1 decreases. This decrease in its cathode bias together with the occurrence of an incoming positive pulse on its control grid from the signal source 3, causes triode V–1 to conduct, triode V–2 to cut off, and the entire above described cycle to be repeated.

It will be noted that the amplitude of the positive pulse from the signal source 3 alone is not sufficient to cause triode V–1 to conduct. Coincidence of an incoming pulse at the beginning of the negative swing of the tank 6 is required. Thus, the time interval between transitions of the multivibrator is determined by the potential across the tank circuit which is preferably designed to resonate at the desired output frequency and the occurrence of the incoming signal from source 3. Moreover as is desired the negative going output signal at the cathode of triode V–2 as well as the output pulse on its control grid is locked on the incoming trigger signal of source 3.

By means of the insertion of resistors R–4 and R–5, the Q of the tank circuit 6 is decreased. It has been found that in this manner the oscillations of the tank will lock on input signals from source 3 which may vary in frequency up to ±10 cycles.

Obviously many modifications and variations of the present invention are possible in the light of the above teachings. It is therefore to be understood that within the scope of the appended claim the invention may be practiced otherwise than as specifically described.

What is claimed is:

Apparatus for phase locking an output pulse upon an incoming signal wherein the frequency of said output pulse is a submultiple of the frequency of the incoming signal said apparatus comprising a cathode coupled multivibrator circuit including a pair of electron tubes each having a control grid; means coupling the incoming signal to one control grid; a tank circuit coupled to the other control grid, said tank circuit including an energy dissipating resistor and having a resonant frequency which is substantially a submultiple of the frequency of the incoming signal; and a resistor series connected between the tank circuit and said other control grid.

References Cited in the file of this patent

UNITED STATES PATENTS

| | | |
|---|---|---|
| 2,413,956 | Coykendall | Jan. 7, 1947 |
| 2,553,165 | Bliss | May 15, 1951 |
| 2,560,576 | Hoeppner | July 17, 1951 |